UNITED STATES PATENT OFFICE.

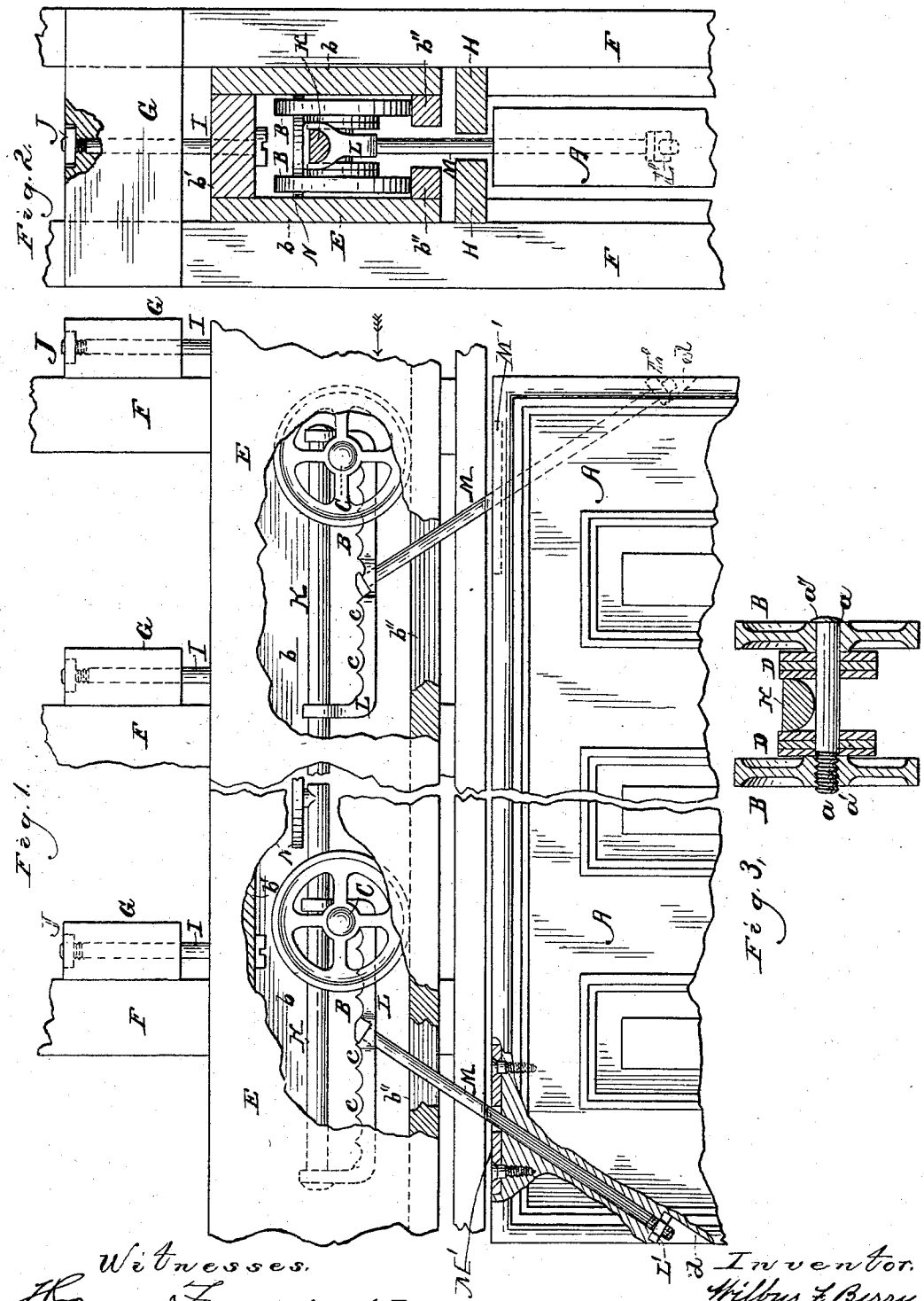

WILBUR F. BERRY, OF CHICAGO, ILLINOIS.

DOOR-HANGER.

SPECIFICATION forming part of Letters Patent No. 280,342, dated July 3, 1883.

Application filed December 13, 1882. (No model.)

*To all whom it may concern:*

Be it known that I, WILBUR F. BERRY, of Chicago, in the county of Cook and State of Illinois, have invented certain new and useful Improvements in Door-Hangers, of which the following, in connection with the accompanying drawings, is a specification.

In the drawings, Figure 1 is a side view, shown partly in section or broken away, of a door-hanger embodying my invention. Fig. 2 is a vertical cross-section or edge view of the parts shown in Fig. 1, viewed in the direction of the arrow there shown; and Fig. 3 is a vertical central cross-section of one pair of wheels or rollers.

Like letters of reference indicate like parts.

A represents a door hung by means of my improved hanger.

B B are the sheaves, and C is the sheave-axle. I make the ends of this axle equal in diameter to the remaining portion, as shown at $a$ $a$, and on one of these ends I make a screw-thread, as shown at $a'$. Both sheaves have central openings to receive the ends of the axle, and the central opening in one wheel is screw-threaded to permit that wheel to be run upon the screw-threaded end of the axle, which wheel may be retained upon the axle by means of a nut or pin, or in any well-known or suitable way. The other sheave is slipped upon the opposite end of the axle, and the part $a$, passing through that sheave, is headed down upon the sheave, as shown at $a''$.

D D are washers interposed between the sheaves and a rod or bar, K, on the axle. By this means I am enabled to set the sheaves a greater or less distance apart, thereby adapting them to tracks differing from each other in width, it being understood that a greater or less number of washers D D may be arranged upon the axle before the sheaves are applied.

E is the track. This track is a box-like structure consisting of the side pieces, $b$ $b$, of the top piece, $b'$, arranged between the side pieces, and of the rails $b''$ $b''$, also arranged between the side pieces at or near the lower edges thereof, as is clearly shown in Fig. 2. All the parts of the track are fastened rigidly together.

F F are the studding, and G G are cross-bars.

H H are the guards or soffit.

I I are screw-headed screw-bolts passing vertically up through the top piece, $b'$, and through the bars G G, the heads of the bolts being underneath the top piece, $b'$, as shown. The upper ends of the bolts I I are screw-threaded, and J J are nuts run thereon. These nuts rest in mortises or pockets in the bars G G. By these means I am able to adjust the track vertically by passing an ordinary long screw-driver up between the guards H H and turning the bolts I I, it being understood that the nuts J J are prevented from being turned, and that the track is suspended on the heads of the said bolts and arranged between the studding, as shown.

K K are semi-cylindrical rods or bars, having their flat sides upward; and L L are stirrups attached thereto and depending therefrom. In these stirrups are the notches $c$ $c$.

M M are headed bolts passing downward through the stirrups L L diagonally and into the door, as shown, thus suspending the doors and connecting them to the hanger.

L' L' are nuts on the lower ends of the bolts M M, and these nuts are accessible, being located in recesses or mortises $d$ $d$ in the edge of the doors, thereby permitting the door to be adjusted vertically to some extent or hung level.

M' is a door-plate.

N N are guide-rollers on the rods or bars K K.

The bolts M M are square-headed, and also square at those parts which pass through the door-plates and doors, and the door-plates have square or oblong openings to receive these square portions. By this means the stirrups L L and bars K K are held firmly in the line of travel and prevented from being turned out of that line. The rods or bars K K rest and ride upon the axles C C as the doors are moved in and out of their recesses, and the sheaves roll upon the track. In case the doors are tilted slightly in moving them, the bars would be raised off from one of the sheave-axles, and the sheaves thereon, being then free, will roll along the track or rails and become displaced, were it not for the notches $c$ $c$, into one of which the said axle would then fall, and thus be retained in its proper position with relation to the other parts of the hanger. The semi-cylindrical rods K K permit the doors to vibrate laterally to a slight extent. The top piece of the track, by being arranged between the sides, braces the latter firmly, and forms a cover.

Having thus described my invention, what I claim as new, and desire to secure by Letters Patent, is—

1. The combination, in a door-hanger, of the sheave-axle, with a semi-cylindrical traveling rod or bar, K, resting freely with its curvilinear side on the said axle, and sustaining the door-suspending bolts, substantially as and for the purposes specified.

2. The combination, in a door-hanger, of the sheaves B B, the sheave-axle C, having a screw-threaded end and washers, whereby the distance between the said sheaves may be varied on their axle, substantially as and for the purposes specified.

3. The combination, in a door-hanger, of the box-like track E and the screw-bolts I I, passing through the top of the said track, and having grooved heads suspending the said track adjustably, substantially as and for the purposes specified.

4. The combination, in a door-hanger, of the notched stirrups L L with the sheaves, door-suspending bolts, and a rod or bar resting freely on the sheave-axles, substantially as and for the purposes specified.

WILBUR F. BERRY.

Witnesses:
   F. F. WARNER,
   HENRY FRANKFURTER.